US008375843B2

(12) United States Patent
Calvo et al.

(10) Patent No.: US 8,375,843 B2
(45) Date of Patent: Feb. 19, 2013

(54) BRAKE BOOSTER DEVICE WITH DAMPING ELEMENT

(75) Inventors: José Manuel Calvo, Kruft (DE); Hans-Jürgen Griebel, Ketting (DE); Lothar Zeuner, Steineroth (DE)

(73) Assignee: Lucas Automotive GmbH, Koblenz (DE)

( * ) Notice: Subject to any disclaimer, the term of this patent is extended or adjusted under 35 U.S.C. 154(b) by 875 days.

(21) Appl. No.: 12/296,348

(22) PCT Filed: Mar. 27, 2007

(86) PCT No.: PCT/EP2007/002719
§ 371 (c)(1),
(2), (4) Date: Jul. 28, 2009

(87) PCT Pub. No.: WO2007/115684
PCT Pub. Date: Oct. 18, 2007

(65) Prior Publication Data
US 2010/0019566 A1 Jan. 28, 2010

(30) Foreign Application Priority Data
Apr. 7, 2006 (DE) .................... 10 2006 016 545

(51) Int. Cl.
*F15B 9/10* (2006.01)
(52) U.S. Cl. .................. 91/376 R; 303/12; 303/113.3; 303/114.3; 188/356; 92/130 R; 92/169.3
(58) Field of Classification Search .............. 303/12, 303/113.3, 114.3; 188/356; 91/376 R; 92/169.3, 92/130 R
See application file for complete search history.

(56) References Cited

U.S. PATENT DOCUMENTS

| 4,256,016 A | * | 3/1981 | Thomas ................. 91/369.2 |
| 4,377,966 A | * | 3/1983 | Parker et al. ................. 92/48 |
| 4,398,449 A | * | 8/1983 | Takayama et al. ......... 91/376 R |
| 4,535,680 A | * | 8/1985 | Takayama et al. ......... 91/376 R |
| 4,843,948 A | * | 7/1989 | Sugiura et al. ............ 91/369.4 |
| 5,090,294 A | * | 2/1992 | Endou .................... 91/376 R |

(Continued)

FOREIGN PATENT DOCUMENTS
DE 19539601 A1 * 4/1997
FR 2817219 A1 5/2002

OTHER PUBLICATIONS

PCT International Search Report and Written Opinion for Application No. PCT/EP/2007/002719 dated Jul. 20, 2007.

*Primary Examiner* — Robert A Siconolfi
*Assistant Examiner* — Mariano Sy
(74) *Attorney, Agent, or Firm* — MacMillan, Sobanski & Todd, LLC

(57) ABSTRACT

The present invention relates to a brake booster device for a vehicle brake system comprising a force input element, a control valve arrangement actuable via the force input element, a chamber arrangement disposed in a housing and comprising a vacuum chamber and a working chamber, which is separated from the vacuum chamber by a movable wall and connectable selectively to a vacuum source or the atmosphere, and a force output element, wherein the movable wall is biased into a normal position by a resetting spring accommodated at least partially in the housing and wherein the housing is penetrated by at least one fastening bolt. In this case, it is provided that at least one damping element acts for the purpose of vibration damping on the resetting spring, wherein the at least one damping element is mounted on the at least one fastening bolt.

14 Claims, 4 Drawing Sheets

U.S. PATENT DOCUMENTS

| | | | | |
|---|---|---|---|---|
| 5,158,004 A | * | 10/1992 | Bauer | 91/369.2 |
| 5,176,433 A | * | 1/1993 | Byrnes et al. | 303/113.3 |
| 5,487,327 A | * | 1/1996 | Schluter et al. | 92/128 |
| 5,658,055 A | * | 8/1997 | Dieringer et al. | 303/114.3 |
| 6,976,417 B2 | * | 12/2005 | Leboisne et al. | 91/369.2 |
| 2007/0137473 A1 | | 6/2007 | Drumm | |

* cited by examiner

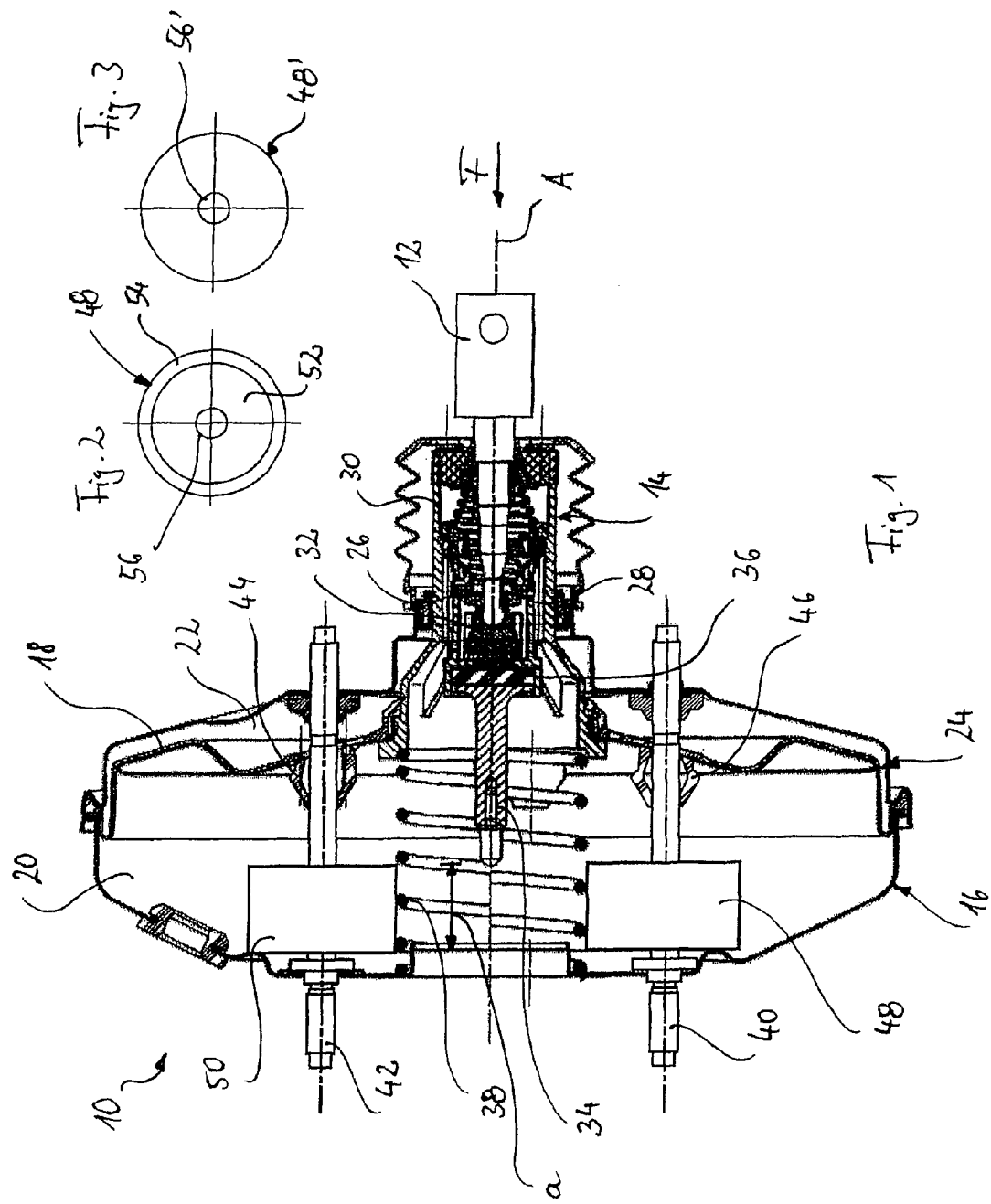

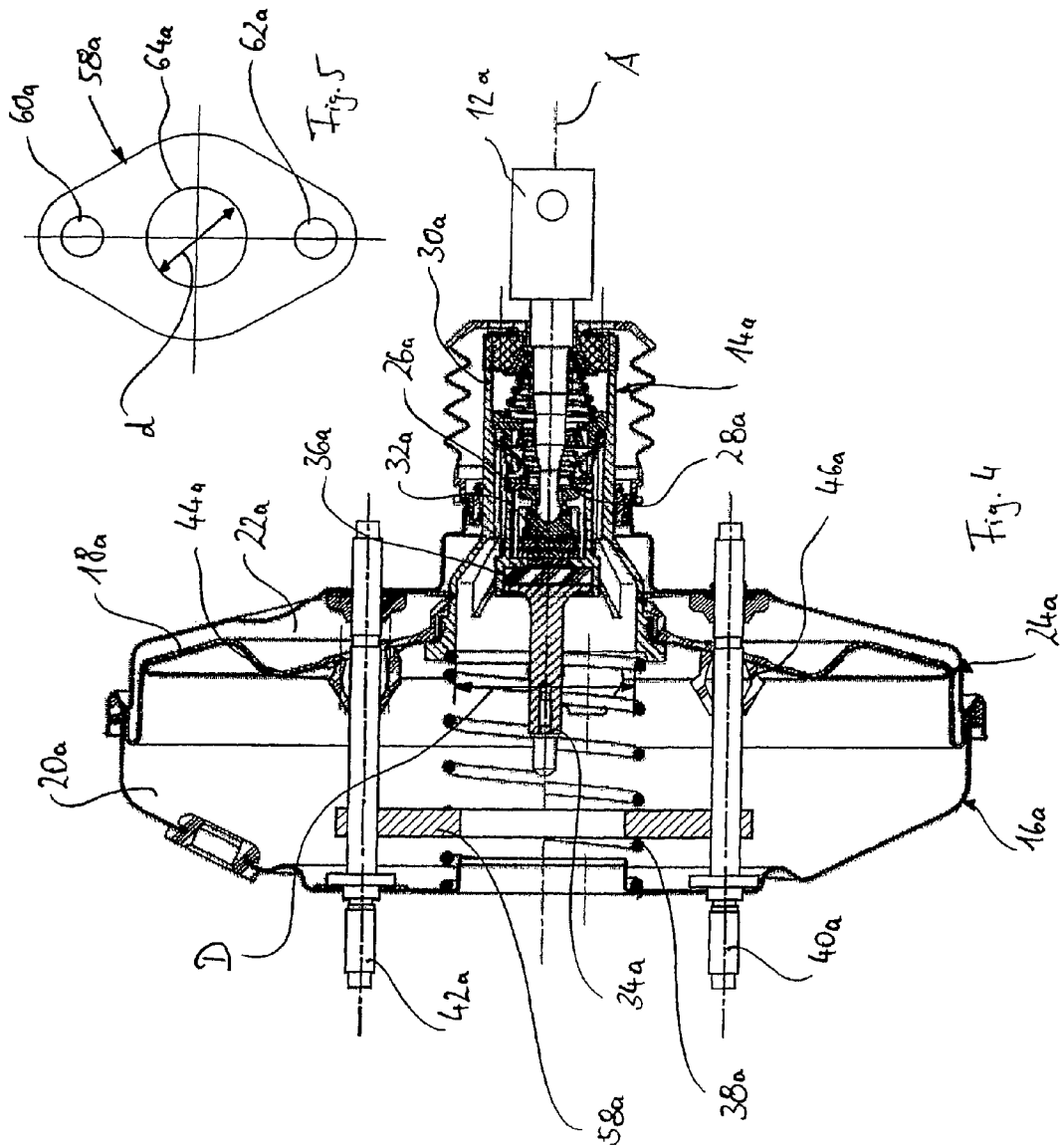

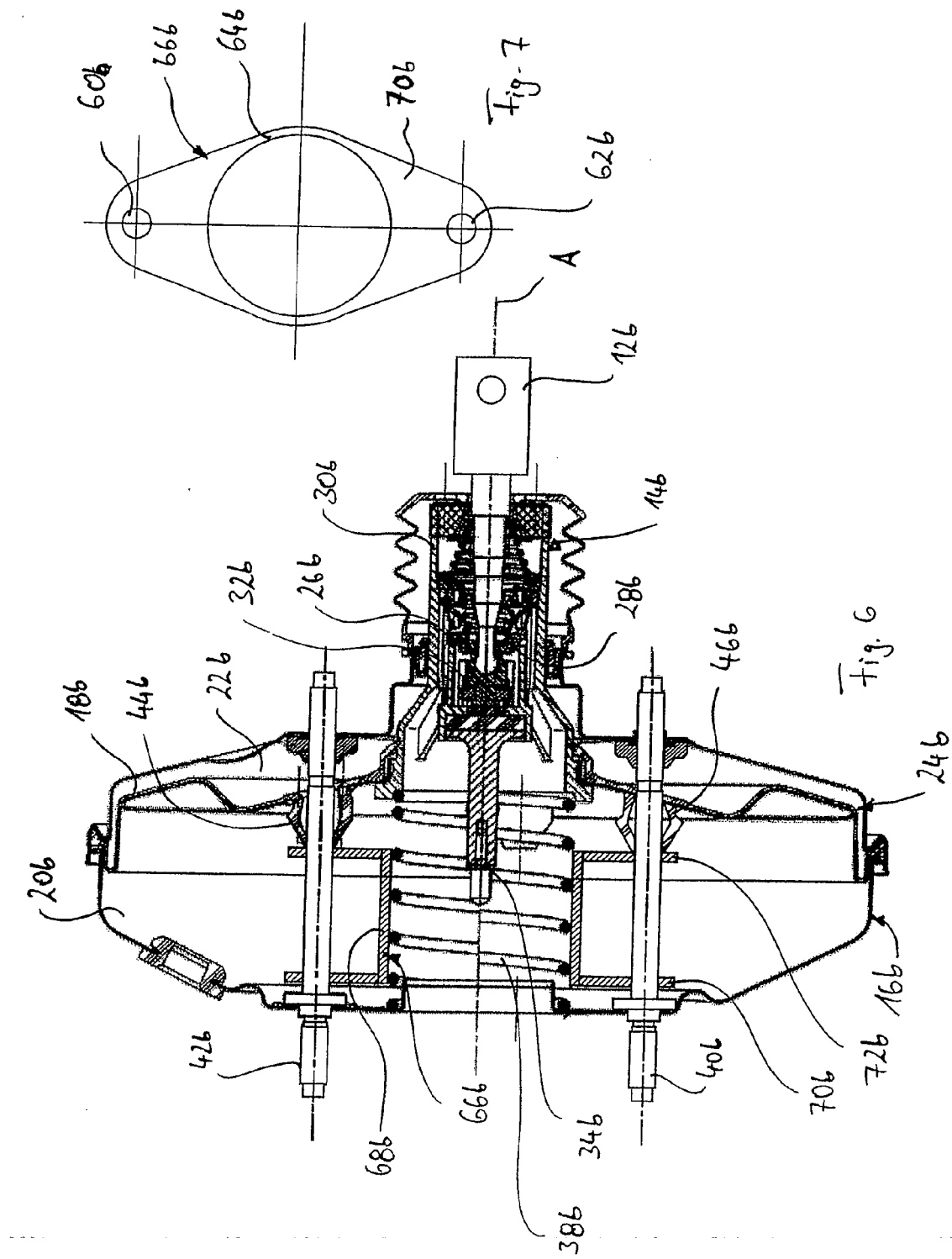

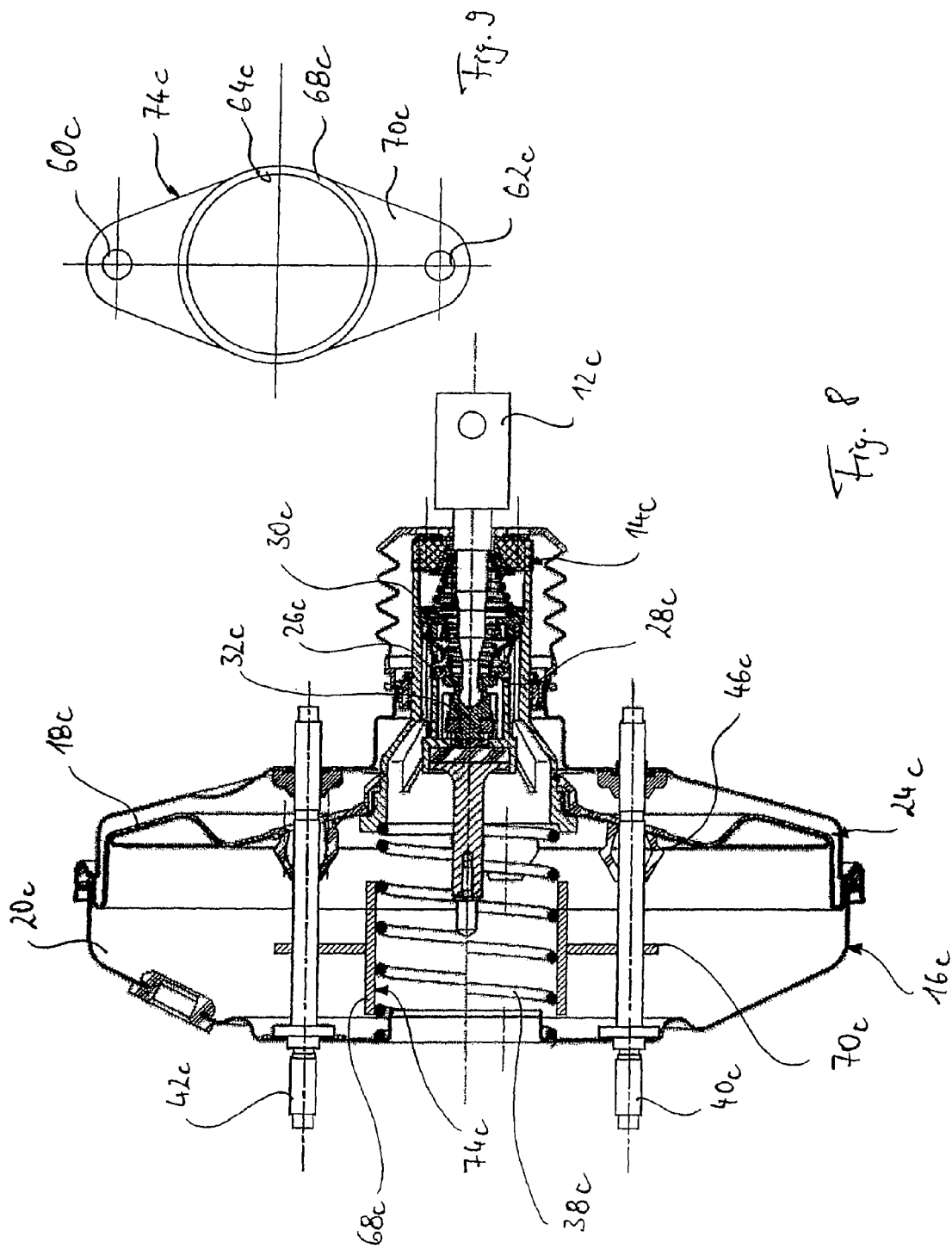

BRAKE BOOSTER DEVICE WITH DAMPING ELEMENT

CROSS-REFERENCE TO RELATED APPLICATIONS

This application claims priority to International Patent Application No. PCT/EP2007/002719 filed Mar. 27, 2007, the disclosures of which are incorporated herein by reference in entirety, and which claimed priority to German Patent Application No. 10 2006 016 545.4 filed Apr. 7, 2006, the disclosures of which are incorporated herein by reference in entirety.

BACKGROUND OF THE INVENTION

The present invention relates to a brake booster device for a vehicle brake system comprising a force input element, a control valve arrangement actuable via the force input element, a chamber arrangement disposed in a housing and comprising a vacuum chamber and a working chamber, which is separated from the vacuum chamber by a movable wall and connectable selectively to a vacuum source or the atmosphere, and a force output element, wherein the movable wall is biased into a normal position by means of a resetting spring accommodated at least partially in the housing and wherein the housing is penetrated by at least one fastening bolt.

Such a brake booster device is sufficiently known from the background art. There is also often mention of a pneumatic brake booster, in which where necessary by means of the control valve arrangement a pressure difference at the movable wall is built up, which then boosts the brake force applied to the brake pedal by the driver and therefore assists the braking operation. As a result, the driver need expend less force for a braking operation, so that even drivers with weak leg musculature may achieve an adequate braking effect in every driving situation.

It has however emerged that, particularly in the course of progressive weight reductions in automotive engineering that have led to the installation of increasingly lighter parts, there has been a disadvantageous change in the vibration response of individual components. Because of the use of low-mass parts, in particular as a result of the use of lightweight materials such as for example aluminium or magnesium or alloys containing these elements, these parts have an increasing tendency to vibrate. It has for example emerged that, if for example the brake mechanism, in particular the brake pedal and the pedal bracket are formed from such lightweight materials, the resulting low inertia may lead to the actuating mechanism having a specific tendency to vibrate, which then leads to undesirable noises.

From FR 2 817 219 an arrangement that is to counteract this problem is known. For this purpose, a pot-like damping element is slipped onto the end of the resetting spring of the brake booster device.

With this solution it has however in turn emerged that the fixing of the damping element to the resetting spring may cause problems both with regard to assembly and during operation, which may ultimately lead to malfunctioning of the brake booster.

BRIEF SUMMARY OF THE INVENTION

Against this background, a feature of the present invention is to provide a brake booster device of the initially described type, in which the tendency to vibrate is considerably reduced and easier, fault-free assembly combined with increased operational reliability is guaranteed.

This feature is achieved by a brake booster device having at least one damping element, which acts for the purpose of vibration damping on the resetting spring, wherein the at least one damping element is mounted on the at least one fastening bolt.

By acting directly on the resetting spring the damping element according to the invention is able to suppress the generation of vibrations, thereby also preventing corresponding vibrations from being transmitted to the actuating mechanism. Thus, the problem of the undesirable occurrence of vibrations is tackled right at the source, i.e. upon the development of such vibrations. The mounting according to the invention of the damping element on the at least one fastening bolt ensures fault-free assembly and stable positioning of the damping element throughout the life of the brake booster device without any risk of accidental separation or inappropriate positioning. It is moreover guaranteed that an unwanted displacement of the damping element inside the housing of the brake booster device does not occur, say, as a result of function-related movements of the resetting spring.

A development of the invention provides that the at least one damping element acts in a vibration-damping manner on a peripheral region, preferably on an outer peripheral region, of the resetting spring. The mounting on the outer peripheral region of the resetting spring offers the advantage of particularly effective vibration damping. It is however equally possible to act on the inner peripheral region of the resetting spring, for example by means of a damping tubular piece, which is introduced into the inner peripheral region and mounted by means of a fastening plate on the at least one fastening bolt.

According to a constructional variant of the invention, it may be provided that the at least one damping element is of a cylindrical, preferably hollow-cylindrical, in particular cup-shaped design. It is therefore possible to provide a single cylindrical damping element that surrounds the resetting spring. It is however equally possible to provide individual damping elements, wherein a damping element is associated with each fastening bolt. This damping element then acts only in sections on the resetting spring that is to be damped. For example, the individual damping elements in this constructional variant may each have a location opening, by which they are mounted onto the respective fastening bolt and fixed thereon. The invention therefore provides that a plurality of damping elements are disposed around the outer periphery of the resetting spring on a corresponding plurality of fastening bolts. As an alternative to this, it may be provided that the at least one damping element surrounds the resetting spring over the entire periphery thereof, as already outlined above.

As regards the axial extent, it may be provided that the at least one damping element extends at least along part of the axial length of the resetting spring. Naturally, it is also possible for the damping element to extend along the entire axial length of the resetting spring, but in this case the damping element has to be of an axially compressible design.

In order to achieve a particularly good damping effect, a development of the invention provides that in the region of the ends of the resetting spring in each case at least one damping element is disposed.

As regards the choice of material of the damping element, according to the invention it may be provided that the damping element is manufactured from an elastically deformable material, in particular a rubber- or foam material.

An alternative constructional variant of the invention provides that the at least one damping element is of a disk-shaped design and extends in between turns of the resetting spring. Instead of acting on the outer peripheral region of the resetting spring, the damping element prevents vibrations by engaging between individual spring turns of the resetting spring and hence acting in a vibration-damping manner thereon. Particularly with this form of construction, a plurality of such disk-shaped damping elements may be used.

An advantageous constructional variant, which is notable in particular for its low weight, provides that the at least one damping element comprises a cylindrical damping body and at least one fastening disk connected thereto. The damping body may therefore be of a relatively thin-walled design, which as a rule offers adequate damping. The fastening to the fastening bolt is then effected by means of the likewise thin-walled fastening disk. To save weight, a construction of the one or more damping elements from solid material may therefore be avoided. In this connection, it may be provided that the at least one damping element—viewed in an axis-containing section—comprises a U-section. Given a construction of the damping element from a U-section, this provides for example a tubular damping body as well as two fastening disks, which extend orthogonally relative to the longitudinal direction of the tubular damping body and are used for the fastening to the fastening bolt. If only one fastening disk per damping element is used, it may be provided that the at least one damping element—viewed in an axis-containing section—comprises a T-section. This means that the damping disk is then disposed approximately in the centre of the tubular body and extends orthogonally relative to the longitudinal direction thereof. Damping element and fastening disk may be formed integrally with one another, but may equally be glued or vulcanized to one another. It should moreover be stressed that L-sections or asymmetrical sections may also be used.

The invention further relates to a damping element having the previously described features for use in a brake booster device of the previously described type. To avoid repetition, the damping element features described in detail above are not mentioned again here.

Other advantages of this invention will become apparent to those skilled in the art from the following detailed description of the preferred embodiments, when read in light of the accompanying drawings.

BRIEF DESCRIPTION OF THE DRAWINGS

FIG. 1 is an axis-containing section of a brake booster device according to the invention with the damping elements in a first form of construction of the invention;

FIG. 2 is a front view of a damping element of a cup-shaped design;

FIG. 3 is a front view of a cylindrical damping element made of solid material;

FIG. 4 is a view corresponding to FIG. 1 of a second form of construction of the invention;

FIG. 5 is a front view of the damping element used in FIG. 4;

FIG. 6 is a sectional view corresponding to FIGS. 1 and 4 of a third constructional variant of the invention;

FIG. 7 is a front view of the damping element used in the form of construction according to FIG. 6;

FIG. 8 is a sectional view corresponding to FIGS. 1, 4 and 6 of a fourth form of construction of the invention and FIG. 9 is a front view of the damping element used in the fourth form of construction according to FIG. 8.

DETAILED DESCRIPTION OF THE INVENTION

In FIG. 1 a brake booster according to the invention is generally denoted by 10. It comprises a force input element 12, a control valve arrangement 14 connected to the force input element, and a housing 16. Disposed in the housing 16 is a movable wall 18 that separates a vacuum chamber 20 in a sealing manner from a working chamber 22. The two chambers 20 and 22 form a chamber arrangement 24. The control valve 14 contains two valve seats 26 and 28, which are associated with a control valve housing 30 and a control valve element 32. Associated with the control valve 14 is a force output element 34, which is connected by a rubber-elastic reaction element 36 to the control valve housing.

Accommodated in the housing 16 is a resetting spring 38, which is supported by its, in FIG. 1, left end against the left housing wall and acts with its, in FIG. 1, right end on the control valve housing 30. As may be seen in FIG. 1, the control valve housing 30 is connected in a fixed manner to the movable wall 18 for joint movement along the longitudinal axis A. In the course of such a movement the movable wall (18), sealed by sealing elements 44 and 46, slides along the fastening bolts 40 and 42.

Mounted on the fastening bolts 40, 42 are damping elements 48 and 50 respectively, which are of a substantially cylindrical design. The damping elements 48 and 50 are dimensioned in such a way that they act with their outer periphery on a longitudinal portion a of the resetting spring 38 at the outer periphery thereof.

The brake booster 10 according to the invention operates as follows:

As a result of an actuation of the brake pedal by an actuating force F, as indicated in FIG. 1, the force input element 12 is displaced in FIG. 1 to the left along the longitudinal axis A. This leads in an as such known manner to opening of the control valve arrangement so that the working chamber 22 is temporarily connected to the ambient atmosphere. The vacuum chamber 20 is held constantly sub vacuo, in that it remains connected for example to a vacuum source or to the intake tract of the vehicle. As a result of the pressure difference that builds up at the movable wall 18, the movable wall 18 is pressed in FIG. 1 to the left, with the result that the control valve housing 30 is pulled along until the control valve arrangement 14 closes again. A quasi-stationary state is then reached, in which a specific braking effect is maintained.

When the driver eases off the pedal and reduces the pedal force to zero, the sealing seat 26 is opened, with the result that a pressure equalization may occur at the movable wall 18 in that the working chamber 22 is connected to the vacuum chamber 20. As a result of this, upon release of the brake pedal the arrangement is moved by means of the resetting spring 38 back into the normal state shown in FIG. 1.

During this operation but also during starting of the vehicle, after which a vacuum builds up in the vacuum chamber 20, the spring 38 may be excited into vibrations, which may then be transmitted via the control valve housing 30 and the force input element 12 to the brake pedal (not shown). In conventional brake systems, these vibrations would as a rule be rapidly reduced because of the inertia of the brake pedal and further components. In the course of the progressive use of components manufactured in a lightweight style of construction, such as for example a brake pedal manufactured from magnesium, such vibrations however occur to a greater extent and occasionally lead to unpleasant noises.

In this connection, the invention provides that the vibrations arising at the resetting spring 38 are, immediately upon their development, damped by means of the damping elements 48 and 50. The damping elements 48 and 50 for this purpose are manufactured from a rubber-elastic material, for example from an elastomeric foam material, and ensure an effective damping of vibrations by acting directly on the outer periphery of the resetting spring 38.

FIG. 2 shows by way of example a damping element 48 in a cup shape. It comprises a base 52, onto which a hollow-cylindrical portion 54 is integrally moulded. In the centre, the base 52 is designed with a fastening opening 56. During assembly, the damping element 48 may simply be mounted onto a fastening bolt 42 and is held in a stable position on the fastening bolt 42 by means of an interference fit between the fastening bolt 42 and the fastening hole 56 or by means of additional clamping or screw-connection means. The mutual abutment of the outer peripheral regions of resetting spring 38 and damping elements 48 and 50 ensures a reliable damping of the vibrations at the resetting spring 38, even when the abutment extends only over the longitudinal portion a.

FIG. 3 shows an alternative constructional variant of a damping element 48', which is formed cylindrically from a solid foam material body and has a central fastening opening 56'. The mode of operation of this damping element is identical to that of FIG. 2. The damping element 48' according to FIG. 3 exhibits an increased damping response compared to the damping element of FIG. 2 because the entire peripheral region is deformed to a lesser extent than the region of the tubular portion 54 remote from the base 52 in the form of construction according to FIG. 2.

FIGS. 4 and 5 show a second embodiment of the brake booster device according to the invention. To avoid repetition, only the differences from the first embodiment are described, wherein for components of an identical type or of an identical effect the same reference characters as for the first embodiment are used, only with the lower case letter "a" as a suffix.

In contrast to the first embodiment according to FIGS. 1 to 3, in the second embodiment according to FIGS. 4 and 5 only one damping element 58a is provided, the base of which is designed in the shape of a diamond with rounded corners, as FIG. 5 reveals. It is further evident from FIG. 5 that the damping element 58a has two fastening openings 60a and 62a, as well as a central hole 64a. The fastening openings 60a and 62a are used for mounting onto the fastening bolts 40a and 42a. The diameter d of the central hole 64a is smaller than the inside diameter D of the resetting spring 38a. The inside diameter d is however large enough to receive without contact the force output element 34a and a piston end of a master cylinder arrangement, which is connected to the force output element 34a but is not shown in the figures.

Because of such a dimensioning of the inside diameter d of the central hole 64a, the damping element 58a extends in between two turns of the resetting spring 38a and acts at least in sections also on these turns. A vibrational movement of the resetting spring 38a is therefore damped in the region of these turns by friction as a result of the contact between damping element 58a and resetting spring 38a. The damping element 58a, as already explained, has been slipped onto the fastening bolts 40a and 42a and fixed thereon by means of an interference fit or additional clamping elements. It should further be mentioned that the damping element 58a is formed from elastically deformable material so that it may, on the one hand, adapt to the shape of the turns and, on the other hand, provide adequate damping.

In a development of the embodiment according to FIG. 4, it may also be provided that a plurality of damping elements 58a are slipped in axial direction onto the fastening bolts 40a and 42a and engage in each case between axially successive turns.

FIGS. 6 and 7 show a third constructional variant of the invention. Once more, only the differences from the first and second constructional variants of the invention are described and for components of an identical type and an identical effect the same reference characters are used, only with the lower case letter "b" as a suffix.

The form of construction according to FIGS. 6 and 7 shows a damping element 66b, which comprises a tubular damping body 68b and two fastening disks 70b and 72b. The two fastening disks 70b and 72b are mounted on the respective axial ends of the damping body 68b. As is evident from FIG. 7, the fastening disks 70b are designed likewise in the shape of a diamond with rounded edges. They do however have a relatively large central hole 74b, which corresponds approximately to the outside diameter of the resetting spring 38b. More precisely, the damping body 68b lies against the outer periphery of the resetting spring 38b.

The form of construction according to FIGS. 6 and 7 is notable for the fact that it lies over a relatively long axial region of the resetting spring 38b against the outer periphery thereof and may effectively dampen the vibrations thereof. By virtue of providing two fastening disks 70b and 72b, the damped vibrations may be diverted more efficiently to the fastening bolts 40b and 42b. What is more, by virtue of providing two fastening disks 70b and 72b, a stable mounting of the damping element 66b in the housing 16b is guaranteed. The sectional representation according to FIG. 6 reveals a cross section of the sealing element 66b in the shape of a U-section.

Finally, FIGS. 8 and 9 show a further embodiment of the invention, wherein once more the same reference characters as before are used for components of an identical effect or of an identical type, only with the lower case letter "c" as a suffix.

This form of construction differs from the last-mentioned form of construction according to FIGS. 6 and 7 in that the damping element 74c in cross section is designed like a T-section, i.e. with a tubular damping body 68c in the style of the form of construction according to FIG. 6 but with only one fastening disk 70c, which is disposed approximately in the centre of the tubular damping body 68c and extends from there radially outwards for the purpose of mounting on the fastening bolts 40c and 42c.

A common feature of all of the forms of construction is however that the respective damping element is mounted on the fastening bolts and is therefore easier to assemble and more stable, in terms of positioning, throughout the life of the brake booster.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. Brake booster device for a vehicle brake system comprising:
 a force input element,
 a control valve arrangement actuable via the force input element,
 a chamber arrangement disposed in a housing and comprising a vacuum chamber and a working chamber, which is separated from the vacuum chamber by a movable wall and connectable selectively to a vacuum source or the atmosphere, and
 a force output element,
 wherein the movable wall is biased into a normal position by means of a resetting spring accommodated at least partially in the housing and wherein the housing is penetrated by at least one fastening bolt, wherein at least one damping element, which acts for the purpose of vibration damping on the resetting spring, is mounted on the at least one fastening bolt.

2. Brake booster device according to claim 1, wherein the at least one damping element acts in a vibration-damping manner on a peripheral region of the resetting spring.

3. Brake booster device according to claim 1, wherein the at least one damping element is of a cylindrical design.

4. Brake booster device according to claim 1, wherein a plurality of damping elements are disposed around the outer periphery of the resetting spring on a corresponding plurality of fastening bolts.

5. Brake booster device according to claim 1, wherein the at least one damping element surrounds the resetting spring over the entire periphery thereof.

6. Brake booster device according to claim 1, wherein the at least one damping element extends at least along part of the axial length of the resetting spring.

7. Brake booster device according to claim 1, wherein in the region of the ends of the resetting spring in each case at least one damping element is disposed.

8. Brake booster device according to claim 1, wherein the at least one damping element is manufactured from an elastically deformable material or foam material.

9. Brake booster device according to claim 1, wherein the at least one damping element is of a disk-shaped design and extends in between turns of the resetting spring.

10. Brake booster device according to claim 1, wherein the at least one damping element comprises a cylindrical damping body and at least one fastening disk connected thereto.

11. Brake booster device according to claim 10, wherein the at least one damping element—viewed in an axis-containing section—comprises a U-section.

12. Brake booster device according to claim 10, wherein the at least one damping element—viewed in an axis-containing section—comprises a T-section.

13. Brake booster device according to claim 1, wherein the at least one damping element acts in a vibration-damping manner on an outer peripheral region of the resetting spring.

14. Brake booster device according to claim 1, wherein the at least one damping element is cup-shaped.

* * * * *